United States Patent [19]

Haines et al.

[11] Patent Number: 5,019,279
[45] Date of Patent: May 28, 1991

[54] PROCESS FOR ENRICHING A GAS

[75] Inventors: Hiemi K. Haines, Englewood; Richard L. Christiansen, Littleton, both of Colo.

[73] Assignee: Marathon Oil Company, Findlay, Ohio

[21] Appl. No.: 454,332

[22] Filed: Dec. 21, 1989

[51] Int. Cl.⁵ .................. E21B 43/22; B01F 3/02; B01F 3/04
[52] U.S. Cl. .................... 252/8.554; 166/266
[58] Field of Search .............. 166/266; 252/372, 8.554

[56] References Cited

U.S. PATENT DOCUMENTS

| | | | |
|---|---|---|---|
| 2,217,749 | 10/1940 | Hewitt | 166/266 X |
| 2,623,596 | 12/1952 | Whorton et al. | 166/266 X |
| 2,720,265 | 10/1955 | Tracht | 166/266 |
| 2,724,437 | 11/1955 | Whorton et al. | 166/266 X |
| 2,875,832 | 3/1959 | Martin et al. | 166/266 |
| 3,223,157 | 12/1965 | Lacey et al. | 166/266 |
| 3,228,467 | 1/1966 | Schlinger et al. | 166/266 |
| 3,254,712 | 6/1966 | Sharp | 166/266 |
| 3,442,332 | 5/1969 | Keith | 166/267 X |
| 4,224,992 | 9/1980 | Comberiati et al. | 166/263 X |
| 4,512,400 | 4/1985 | Simon | 166/266 X |
| 4,529,037 | 7/1985 | Froning et al. | 166/266 |
| 4,664,190 | 5/1987 | Carpenter | 166/267 |
| 4,744,417 | 5/1988 | Alameddine | 166/266 X |

Primary Examiner—Robert L. Stoll
Assistant Examiner—Gary L. Geist
Attorney, Agent, or Firm—Jack L. Hummel; Jack E. Ebel

[57] ABSTRACT

A process for enriching a drive gas with intermediate hydrocarbon compounds to enhance the ability of the gas to mobilize hydrocarbons within a subterranean hydrocarbon-bearing formation. The drive gas is contacted with oil containing intermediate hydrocarbons under conditions such that the gas strips intermediate hydrocarbons from the oil. The drive gas may be further enriched upon contacting the gas with stripped oil which has been enriched with intermediate hydrocarbons under conditions such that the gas strips intermediate hydrocarbons from the enriched stripped oil.

19 Claims, 1 Drawing Sheet

PROCESS FOR ENRICHING A GAS

FIELD OF THE INVENTION

The present invention relates to a process for enriching a gas which can be injected into a subterranean hydrocarbon-bearing formation to recover hydrocarbons therefrom, and more particularly, to a process for enriching a gas to improve the qualities of the gas as an enhanced oil recovery agent.

BACKGROUND OF THE INVENTION

Conventionally, gases have been injected into a subterranean hydrocarbon-bearing formation via a well in fluid communication with the formation to displace hydrocarbons from the formation to a well from which hydrocarbons are produced. Several qualities of a gas dictate the efficiency, and therefore success, of any process utilizing the gas to displace hydrocarbons from a subterranean formation. Preferably, a gas which is injected into a subterranean hydrocarbon-bearing reservoir swells hydrocarbons upon contact thereby reducing the viscosity of the hydrocarbons and permitting effective displacement of such hydrocarbons to a producing well in fluid communication with the subterranean formation. In addition, the efficiency of the injected gas in displacing hydrocarbons from the subterranean formation will be increased if the interfacial tension between the gas and the hydrocarbons in the matrix of the subterranean formation is reduced. Further reduction of such interfacial tension may be evidenced by the ability of the gas to be miscible with hydrocarbons present in a subterranean formation. A gas may be miscible with hydrocarbons upon first contact in a subterranean formation or may develop miscibility upon multiple contact with hydrocarbons present in a subterranean formation. Further, efficiency of the injected gas may be dependent upon alteration of formation wettability by the gas or the characteristics of multiphase flow exhibited by the gas and formation hydrocarbons. The effect each of these qualities will have on mobilizing hydrocarbons in a subterranean formation will be dependent on the temperature and pressure of the formation as well as the composition of the gas and formation hydrocarbons.

Carbon dioxide, methane, natural gas, nitrogen, and mixtures thereof have been previously utilized as an injection gas to displace hydrocarbons from a subterranean hydrocarbon-bearing formation. While such gases are economically attractive, they are less soluble in formation hydrocarbons than normally gaseous intermediate hydrocarbons, in particular $C_2$-$C_4$ paraffins, i.e., liquified petroleum gas (LPG), and accordingly, result in less efficient recovery of hydrocarbons from a subterranean formation. It has been proposed to enhance a process for recovering hydrocarbons from a subterranean formation utilizing primary drive gases, such as carbon dioxide, methane, and/or nitrogen, by enriching such gas with intermediate hydrocarbon gases prior to injecting the primary drive gas into the formation so as to improve the qualities of the primary drive gas as an enhanced oil recovery agent. Such addition of intermediate hydrocarbon gases to a primary drive gas is feasible where the value of incremental oil attributable to the process in which the primary gas drive is utilized is greater than the value of the intermediate hydrocarbons incorporated in the primary gas drive.

The cost of adding intermediate hydrocarbons to the primary drive gas often is high, resulting in efforts to minimize the amount of intermediate hydrocarbons added. Even when the quantity of intermediate hydrocarbons added is maintained at a minimum level required to improve the qualities of the primary drive gas, the cost of the flooding process may still be unacceptably high. The relative unavailability of intermediate hydrocarbon gas at a field location may also contribute to an unacceptable process cost. Accordingly, a need exits for an economical and efficient process for enriching a primary drive gas to be utilized in a process to displace hydrocarbons from a subterranean hydrocarbon-bearing formation.

Accordingly, it is an object of the present invention to provide an economical process for enriching a primary drive gas to be utilized in a process for recovering hydrocarbons from a subterranean hydrocarbon-bearing formation.

It is a further object of the present invention to provide a reliable and economical source of intermediate hydrocarbon gas for enrichment of a primary drive gas.

It is another object of the present invention to provide a drive gas which is enriched with intermediate hydrocarbon compounds and which is capable of efficiently displacing hydrocarbons from a subterranean formation.

BRIEF SUMMARY OF THE INVENTION

The present invention provides a process for enriching a drive gas to be injected into a subterranean hydrocarbon-bearing formation with intermediate hydrocarbon compounds to improve the ability of the drive gas to displace hydrocarbons in the formation. Oil is contacted with a drive gas under conditions such that the gas strips intermediate hydrocarbon compounds from the oil. The stripped oil can be contacted with a gas containing intermediate hydrocarbon compounds under conditions such that the stripped oil strips intermediate hydrocarbon compounds from the gas. The enriched stripped oil can be contacted with the drive gas under conditions such that the drive gas strips intermediate hydrocarbon compounds from the enriched stripped oil to become further enriched with intermediate hydrocarbon compounds.

BRIEF DESCRIPTION OF THE DRAWING

The accompanying drawing, which is incorporated in and forms a part of the specification, illustrates an embodiment of the present invention and, together with the description, serves to explain the principles of the invention. In the drawing.

DESCRIPTION OF THE PREFERRED EMBODIMENT

Figure 1:
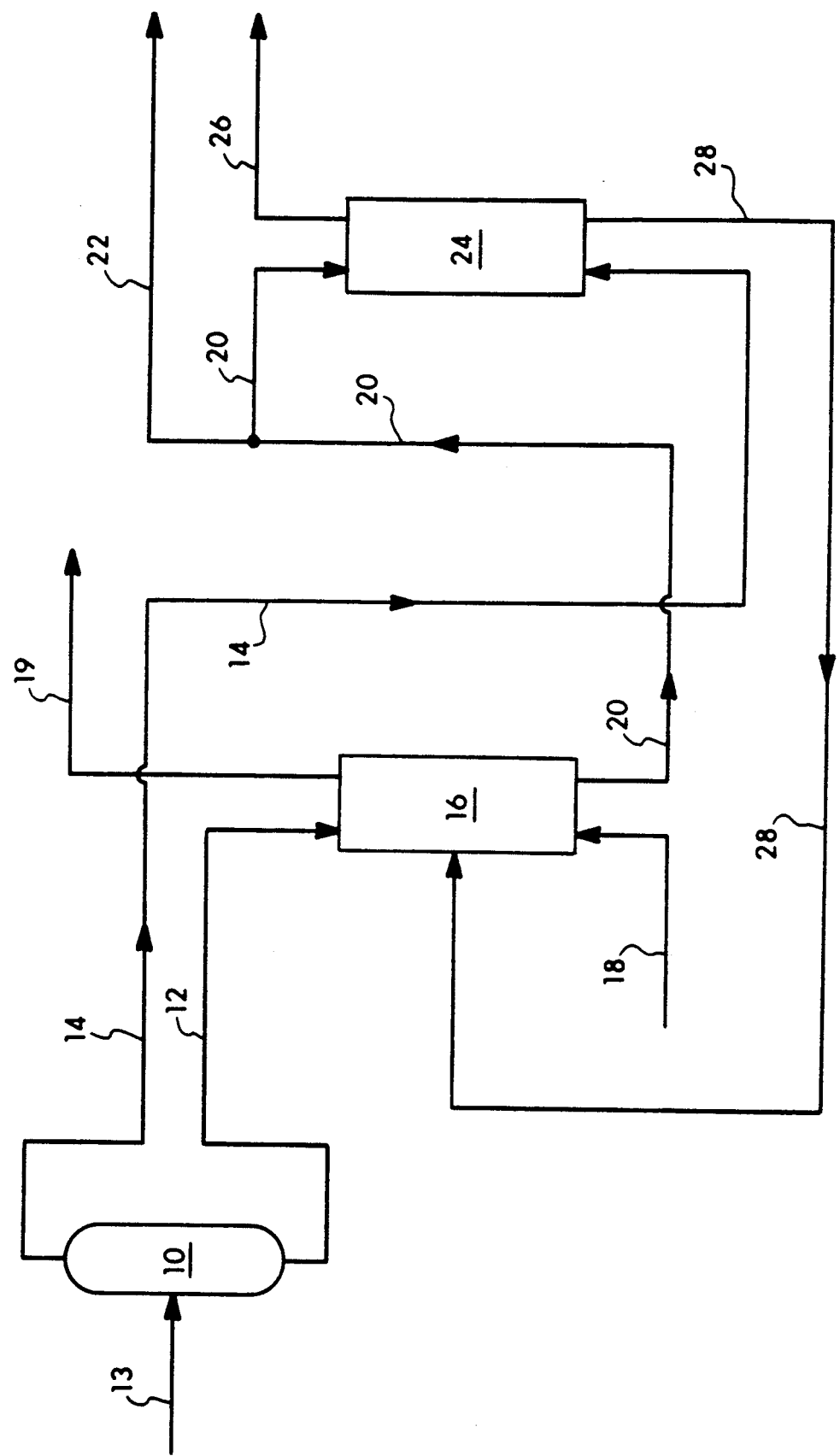
FIG. 1 is a schematic flow diagram of the process of the present invention.

Referring to FIG. 1, hydrocarbons are transported via conduit 13 to a conventional separator 10 which separates the hydrocarbons into oil and gas fractions. The hydrocarbons transported to separator 10 may be hydrocarbons which are produced from a subterranean hydrocarbon-bearing formation into which a primary drive gas is to be injected to displace hydrocarbons therefrom or may be hydrocarbons produced from a separate and distinct subterranean hydrocarbon-bearing formation.

Separator oil exits the separator 10 through conduit 12, and separator gas exits through conduit 14. The separator oil is transported via conduit 12 and introduced into a contractor 16. A gas which is intended to be the primary drive gas in a flooding operation is also introduced to the contactor 16. The gas may be any suitable gas known to function as a primary drive gas, such as carbon dioxide, methane, lean natural gas, nitrogen, or mixtures thereof, and may be provided from any convenient source. Contactor 16 may be operated at pressures of from about 50 to about 5000 psig depending upon the composition of the primary gas drive and the separator oil introduced therein. The separator oil introduced into contactor 16 must have intermediate hydrocarbons present therein in a quantity sufficient to enrich the primary drive gas by partition or desorption therein upon contact. Accordingly, primary drive gases such as nitrogen will need a separator oil having significantly greater quantities of intermediate hydrocarbons than that necessary to enrich a gas such as methane or carbon dioxide.

Separator oil which has been stripped of intermediate hydrocarbons exits contactor 16 through conduit 20 and is introduced into a second contactor 24. A portion of the stripped separator oil may be diverted through conduit 22 for other use or sale prior to introduction of the stripped separator oil to the second contactor 24. Separator gas is also introduced into contactor 24 via conduit 14. The stream of separator gas contacting the stripped separator oil results in intermediate hydrocarbon compounds in the separator gas being absorbed or partitioned into previously stripped separator oil thereby enriching the stripped separator oil with intermediate hydrocarbon compounds. The resulting lean or dried separator gas exits contactor 24 through conduit 26 for further use or sale. The enriched stripped separator oil exits contactor 24 through conduit 28 and is recycled back to contactor 16. Preferably, the separator gas and stripped separator oil flow in countercurrent directions within contactor 24 which may be any suitable countercurrent design which is commercially available as will be evident to the skilled artisan. The enriched stripped separator oil introduced to contactor 16 through conduit 28 provides a source of intermediate hydrocarbons in addition to that provided by separator oil introduced through conduit 12 to enrich primary drive gas introduced to contactor 16 through conduit 18 and withdrawn therefrom through conduit 19.

The operating pressure of contactor 16 should be less than the minimum miscibility pressure of the primary drive gas and the separator oil. By operating at such relatively high pressure the intermediate hydrocarbon compounds of the separator oil are more readily stripped by the gas stream i.e., partitioned or desorbed into the primary drive gas. Likewise, the operating pressure of the contactor 24 should be less than the minimum miscibility pressure of the primary drive gas and the separator oil.

It will be understood that in the context of the invention, the terms "intermediate hydrocarbons" and "intermediate hydrocarbon compounds" each encompass those hydrocarbon compounds having from 2 to 12 carbon atoms. In addition, the term "lean natural gas" refers to a natural gas having at least about 90 mole % methane.

The following example demonstrates the practice and utility of the present invention but is not to be construed as limiting the scope thereof.

EXAMPLE

In accordance with the process of the present invention as described above and illustrated in FIG. 1, 100 moles of a separator oil and 100 moles of a drive gas are introduced into a first contactor which is a packed column designed for countercurrent flow. 102.70 moles of stripped oil from which a portion of intermediate hydrocarbon compounds have been stripped by the drive gas exits the first contactor. 94.14 moles of stripped oil is sold and 8.56 moles is introduced into a second contactor. The second contactor is a packed column designed for countercurrent flow. 30 moles of a separator gas is also introduced into the second contactor wherein the stripped oil strips a portion of intermediate hydrocarbons from the separator gas. 24.38 moles of dried separator gas exits the second contactor for sale and 14.18 moles of enriched stripped oil exits the second contactor and is introduced with the separator oil to the first contactor. 111.48 moles of enriched drive gas exits the first contactor. The operating conditions of both contactors are 700–900 psi and 80–100° F. The mole composition of each oil and gas described above is set forth in Table 1. In Table 1, reference numerals corresponding to the conduit illustrated in FIG. 1 through which and oil or gas flows is parenthetically included after each stream for reference.

TABLE 1

| COMPONENT | SEPARATOR OIL (12) | DRIVE GAS (18) | STRIPPED OIL (20) | STRIPPED OIL (22) (SALES) | STRIPPED OIL (20) (CONTACTOR 24) | SEPARATOR GAS (14) | ENRICHED STRIPPED OIL (28) | DRIED SEPARATOR GAS (26) | ENRICHED DRIVE GAS (19) |
|---|---|---|---|---|---|---|---|---|---|
| $C_1 + N_2$ | 1.50 | 0.00 | 0.50 | 0.46 | 0.04 | 24.00 | 1.00 | 23.04 | 2.00 |
| $CO_2$ | 0.50 | 100.00 | 2.00 | 1.83 | 0.17 | 0.50 | 0.60 | 0.07 | 99.10 |
| $C_2$ | 2.00 | 0.00 | 0.20 | 0.18 | 0.02 | 2.00 | 1.52 | 0.50 | 3.32 |
| $C_3-C_6$ | 21.00 | 0.00 | 19.00 | 17.42 | 1.58 | 3.00 | 4.00 | 0.58 | 6.00 |
| $C_7-C_{10}$ | 30.00 | 0.00 | 32.00 | 29.33 | 2.67 | 0.50 | 3.00 | 0.17 | 1.00 |
| $C_{11}+$ | 45.00 | 0.00 | 49.00 | 44.92 | 4.08 | 0.00 | 4.06 | 0.02 | 0.06 |
| TOTAL | 100.00 | 100.00 | 102.70 | 94.14 | 8.56 | 30.00 | 14.18 | 24.38 | 111.48 |

Employing the operating conditions and compositions of this example should enrich a carbon dioxide drive gas with about 10 mole % of intermediate hydrocarbons. Further, it should be noted that other flash operation may be utilized to reduce the amount of nitrogen and methane in the separator oil and the enriched stripped oil prior to introduction thereof to the first contactor (16).

In accordance with the enriching process of the present invention, a primary drive gas which is to be utilized to displace hydrocarbons from a subterranean hydrocarbon-bearing formation can be enriched by incorporation of about 1 mole % to about 50 mole %, and more preferably of from about 10 mole % to about 30 mole % of intermediate hydrocarbon compounds. The exact composition of the primary drive gas, separator oil, and enriched separator oil as well as the thermodynamic phase behavior of the primary drive gas will dictate the exact mole percent of intermediate hydrocarbons added to the primary drive gas. The process of enriching a primary drive gas in accordance with the present invention can be carried out at a minimum of expense compared to other conventional methods of enriching a primary drive gas since the process of the present invention requires only relatively minor alterations to conventional surface separation equipment.

While the foregoing preferred embodiments of the invention have been described and shown, it is understood that the alternatives and modifications, such as those suggested and others, may be made thereto and fall within the scope of the invention.

What is claimed is:

1. A process for preparing enriched gas for use in the displacement of hydrocarbons in a subterranean hydrocarbon-bearing formation, comprising the steps of:
   contacting oil which has been separated from hydrocarbons produced from a subterranean formation and which contains intermediate hydrocarbon compounds with a first gas under conditions such that the first gas strips intermediate hydrocarbon compounds from the oil to form stripped oil, the first gas thereby becoming enriched with intermediate hydrocarbon compounds;
   contacting the stripped oil with a second gas containing intermediate hydrocarbon compounds under conditions such that the stripped oil absorbs intermediate hydrocarbon compounds from the second gas to form enriched oil; and p1 contacting the enriched oil with the first gas under conditions such that the first gas strips intermediate hydrocarbon compounds from the enriched oil to become further enriched with intermediate hydrocarbon compounds.

2. The process of claim 1, wherein the second gas comprises gas which has been separated from hydrocarbons produced from the formation.

3. The process of claim 1, wherein the first gas prior to enrichment comprises gas which does not contain intermediate hydrocarbon compounds.

4. The process of claim 1, wherein the first gas is selected from the group consisting of carbon dioxide, methane, lean natural gas, nitrogen, and mixtures thereof.

5. The process of claim 1, wherein the intermediate hydrocarbon compounds comprise hydrocarbons compounds having from 2 to 12 carbon atoms.

6. The process of claim 1, wherein the oil and the enriched oil are contacted with the first gas in a countercurrent contactor.

7. The process of claim 1, wherein the oil is contacted with the first gas at a pressure below the minimum miscibility pressure of the first gas and the oil.

8. The process of claim 2, wherein the stripped oil is contacted with the second gas at a pressure below the minimum miscibility pressure of the first gas and the oil.

9. A process for preparing enriched gas for use in the displacement of hydrocarbons in a subterranean hydrocarbon-bearing formation, comprising the steps of:
   enriching a first gas with intermediate hydrocarbon compounds stripped from oil which has been separated from hydrocarbons produced from a subterranean formation and;
   enriching the oil from which intermediate hydrocarbon compounds have been stripped by the first gas with intermediate hydrocarbon compounds absorbed from a second gas which has been separated from hydrocarbons produced from a subterranean formation.

10. The process of claim 9, wherein the second gas comprises gas which has been separated from hydrocarbons produced from the formation.

11. The process of claim 10, wherein the first gas prior to enrichment comprises gas which does not contain intermediate hydrocarbon compounds.

12. The process of claim 10, wherein the first gas is selected from the group consisting of carbon dioxide, methane, lean natural gas, nitrogen, and mixtures thereof.

13. The process of claim 10, wherein the intermediate hydrocarbon compounds comprise hydrocarbon compounds having from 2 to 12 carbon atoms.

14. A process for preparing enriched gas for use in the displacement of hydrocarbons in a subterranean hydrocarbon-bearing formation, comprising the step of:
   separating hydrocarbons produced from a subterranean hydrocarbon-bearing formation to produce separator oil and separator gas;
   stripping intermediate hydrocarbon compounds from the separator oil by contacting the separator oil with a gas stream in a first countercurrent contactor under conditions such that the gas stream strips intermediate hydrocarbon compounds from the separator oil thereby resulting in stripped separator oil, the gas stream thereby becoming enriched with intermediate hydrocarbon compounds:
   absorbing intermediate hydrocarbon compounds from the separator gas by contacting the stripped separator oil with the separator gas in a second countercurrent contactor under conditions such that the stripped separator oil absorbs intermediate hydrocarbon compounds from the separator gas to form enriched stripped separator oil; and
   stripping intermediate hydrocarbon compounds from the enriched stripped separator oil by contacting the enriched stripped separator oil with the said gas stream in the first countercurrent contactor, said gas stream thereby becoming further enriched with intermediate hydrocarbon compounds.

15. The process of claim 11, wherein the gas stream prior to enrichment comprises gas which does not contain intermediate hydrocarbon compounds.

16. The process of claim 14, wherein the gas stream is selected from the group consisting of carbon dioxide, methane, lean natural gas, nitrogen, and mixtures thereof.

17. The process of claim 14, wherein the intermediate hydrocarbon compounds comprise hydrocarbon compounds having from 2 to 12 carbon atoms.

18. The process of the claim 14, wherein the separator oil is contacted with the gas stream at a pressure below the minimum miscibility pressure of the gas stream and the separator oil.

19. The process of claim 14, wherein the stripped separator oil is contacted with the separator gas at a pressure below the minimum miscibility pressure of the separator gas and the separator oil.

* * * * *

UNITED STATES PATENT AND TRADEMARK OFFICE
CERTIFICATE OF CORRECTION

PATENT NO. : 5,019,279
DATED : May 28, 1991
INVENTOR(S) : Hiemi K. Haines et al.

It is certified that error appears in the above-identified patent and that said Letters Patent is hereby corrected as shown below:

Col. 1, line 39:  After "Further," insert therefor--the--.
Col. 5, line 34:  Delete "p1".
Col. 6, line 12:  Delete "claim 10" and insert therefor --claim 9--.
Col. 6, line 15:  Delete "claim 10" and insert therefor --claim 9--.
Col. 6, line 19:  Delete "claim 10" and insert therefor --claim 9--.
Col. 6, line 49:  Delete "claim 11" and insert therefor --claim 14--.

Signed and Sealed this

Twenty-second Day of September, 1992

Attest:

DOUGLAS B. COMER

*Attesting Officer*    *Acting Commissioner of Patents and Trademarks*